Feb. 18, 1958 R. C. HILLIARD 2,824,221
SIGNAL GENERATOR FOR CLUTTER SIMULATION
Filed March 12, 1953 4 Sheets-Sheet 1
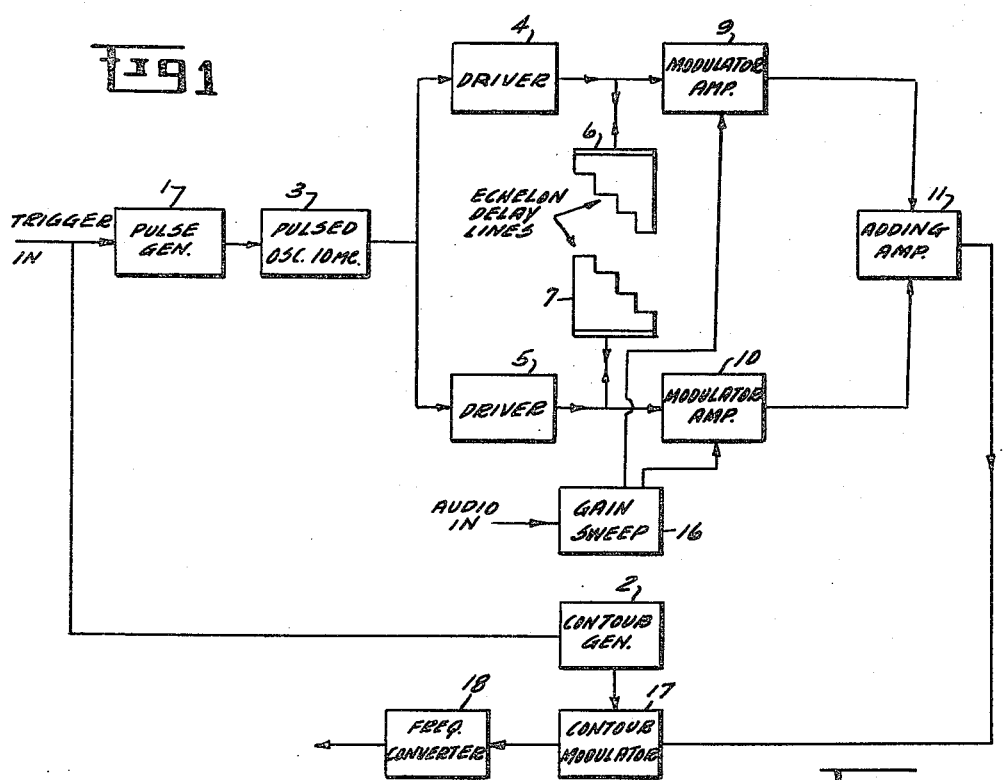
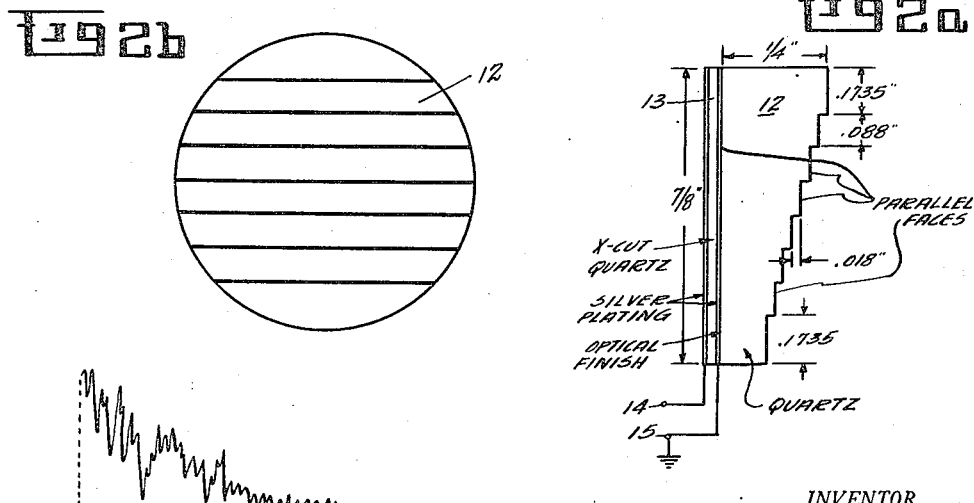
INVENTOR.
ROBERT C. HILLIARD
BY James S. Shannon
AGENT
Wade Koonty
ATTORNEY

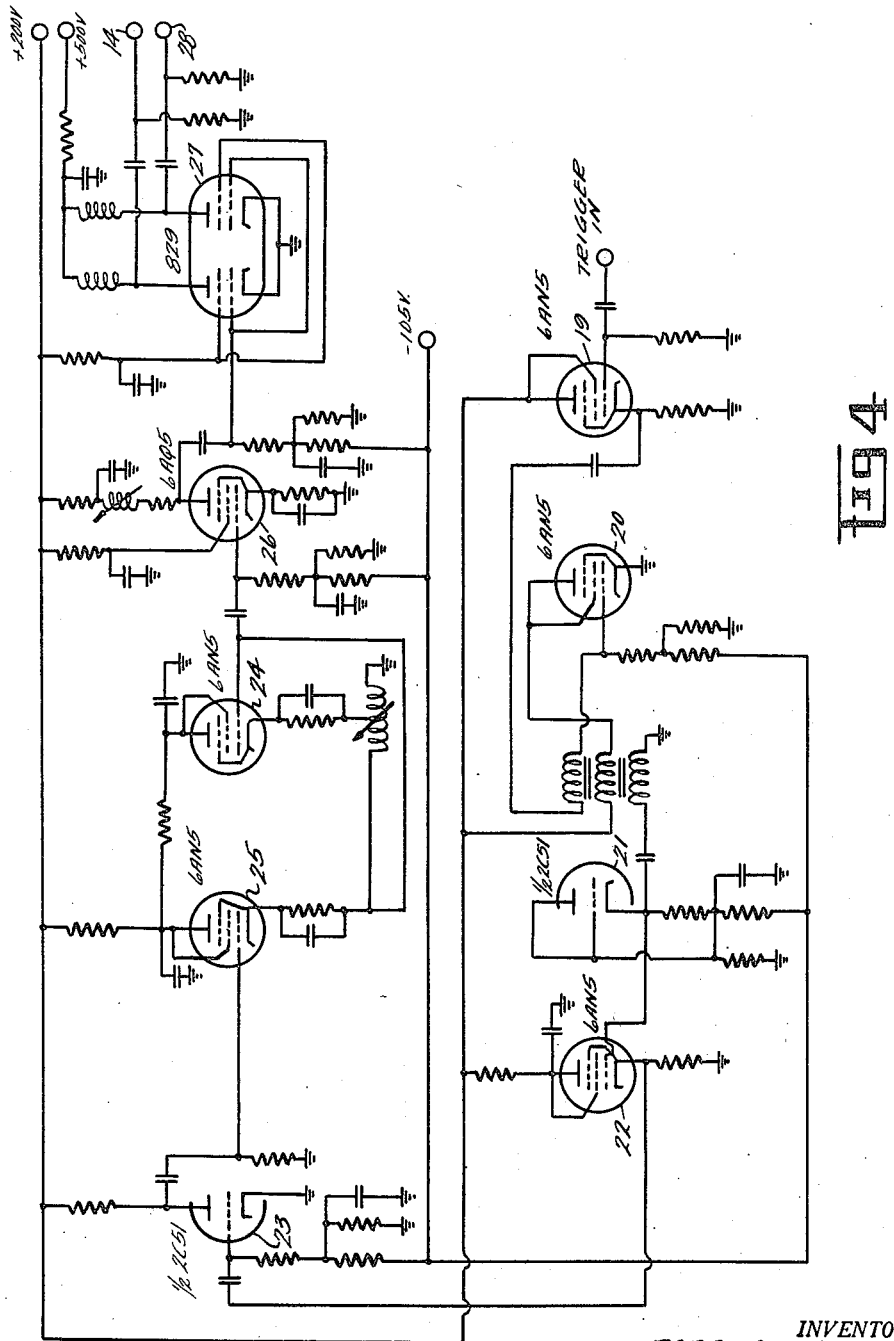

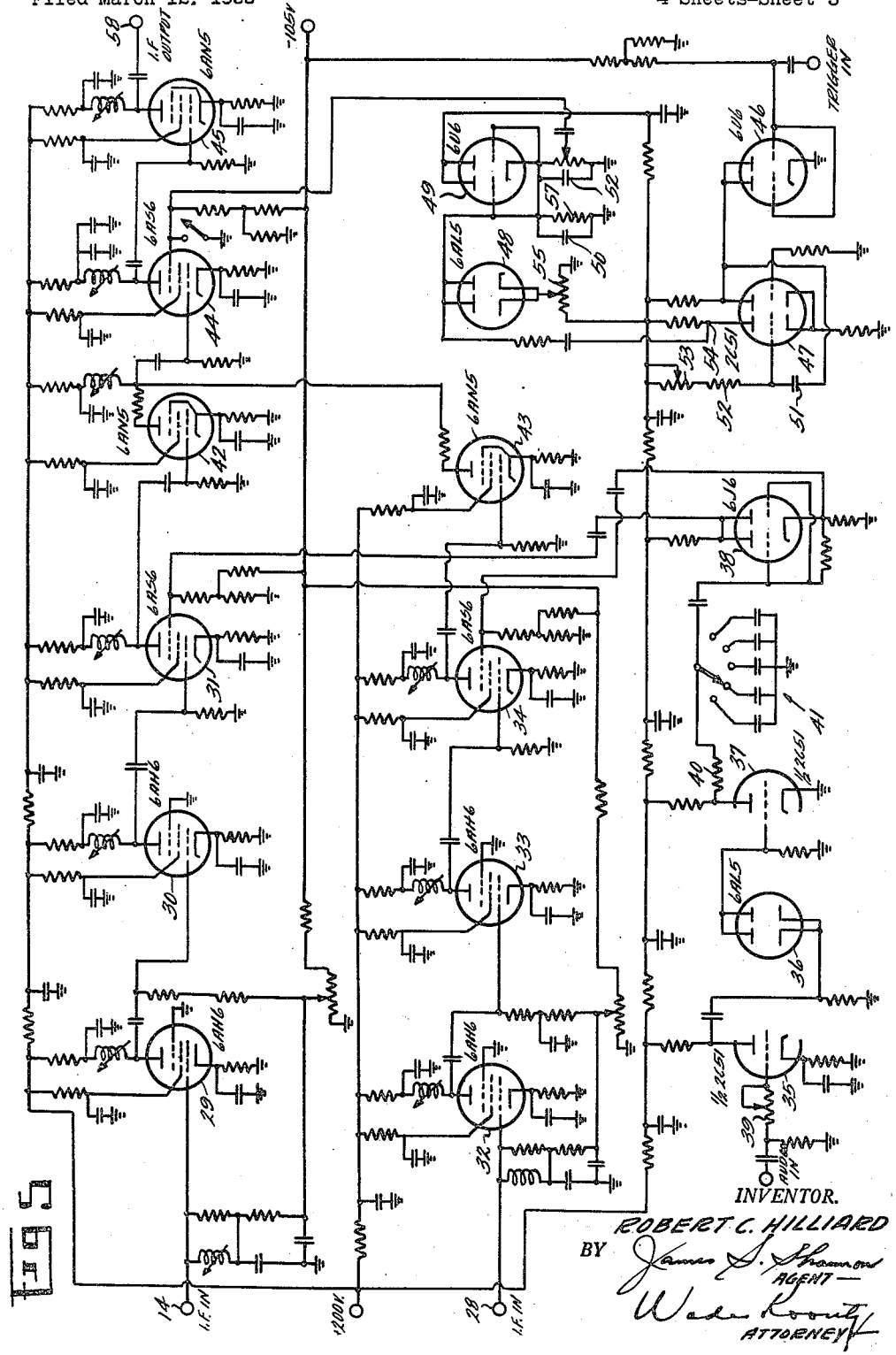

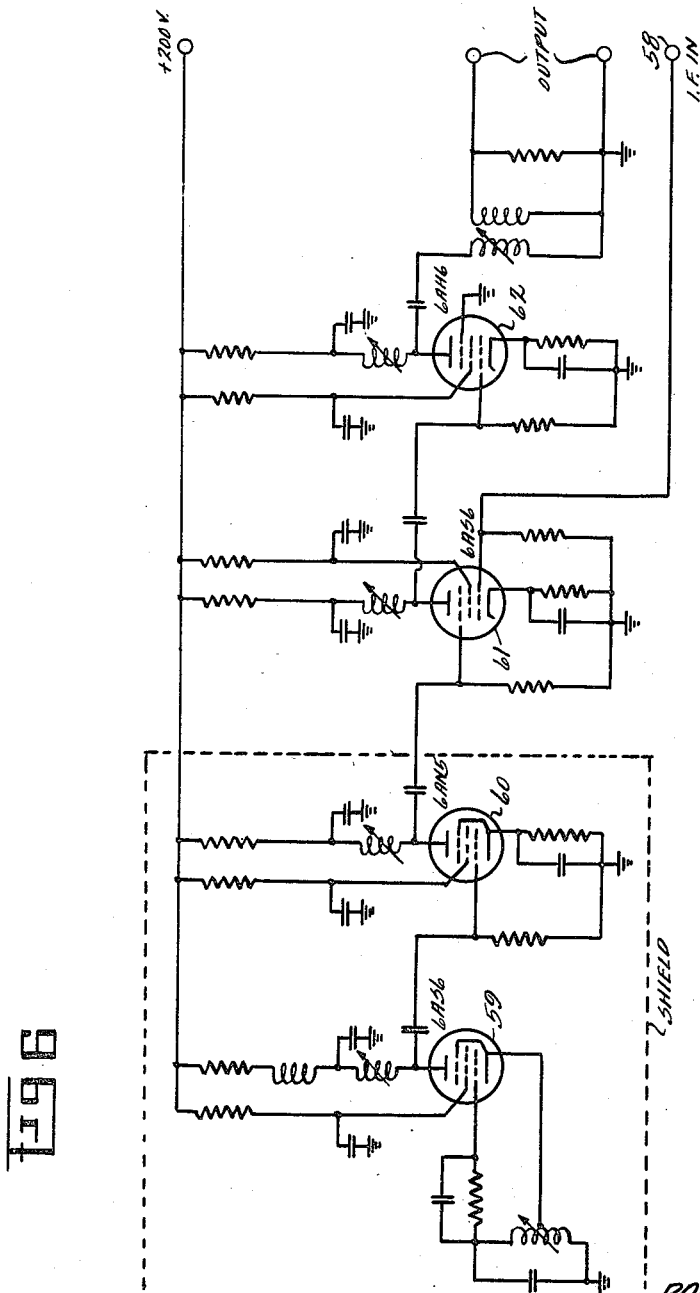

United States Patent Office 2,824,221
Patented Feb. 18, 1958

2,824,221

SIGNAL GENERATOR FOR CLUTTER SIMULATION

Robert C. Hilliard, Beverly Farms, Mass., assignor to the United States of America as represented by the Secretary of the Air Force Application March 12, 1953, Serial No. 341,885

8 Claims. (Cl. 250—27)

This invention relates to signal generators and particularly to a test signal generator for producing signals which correspond to those obtained in pulse radar systems. The generator is intended primarily for use in adjusting the cancellation circuits of airborne moving target indicating (AMTI) radar systems although other uses are not precluded.

The video signal obtained in a radar set consists of target echoes and, usually, a large number of undesired echoes called clutter. The clutter results from the many reflecting objects of diverse character that are usually present with the targets in the field of view of the radar antenna. Since clutter is frequently stronger than the target echoes, its presence seriously limits the usefulness of radar for fixed targets. In the case of moving targets, however, the so-called moving target indicating (MTI) radar systems are capable of indicating the presence of a target in overriding clutter provided the target has a radial velocity relative to the source of radar waves that differs from that of clutter producing objects in the field of view. All MTI systems detect in one way or another the Doppler frequency shift experienced by reflections from a moving target. The frequency comparison may be made with a reference frequency synchronized in phase with the transmitted wave or with the frequency of the clutter signal, the latter method being particularly suitable in AMTI systems. A moving target appears in the video signal of an MTI receiver as a pulse that varies in amplitude at the Doppler frequency. Since the reflections from fixed objects remain unchanged in successive video signals a subtraction of successive signals cancels the clutter, leaving only pulses representing moving targets. The usual procedure is to delay or store the video signal for the period between transmitted pulses and to obtain the difference between the delayed and undelayed signal. In practice more or less clutter fluctuation occurs due to various causes, such for example as the motion of trees, waves or clouds, or due to scanning or instabilities in the radar apparatus, so that complete cancellation is not achieved; however, the clutter can usually be reduced to near the noise level of the receiver.

In designing and also in testing and adjusting cancellation circuits it is desirable to have a source of signals simulating the clutter signals obtained in a radar receiver. It is the object of this invention to provide a signal generator capable of supplying such a signal. A received radar signal is a composite signal in that its instantaneous amplitude is the vector sum of many small reflections from scatterers, some stationary and some in motion, located in a volume defined by the beam cross-section and one-half the transmitted pulse length. The signal, as a result, has randomness of phase and amplitude relative to the transmitted pulse and from one pulse transmission to the next. More specifically, therefore, it is the object of the invention to provide a signal generator capable of producing from a pulse of high frequency energy, a signal having (1) randomness of phase and amplitude relative to the initiating pulse corresponding to the signals received in a radar set subsequent to a pulse transmission, (2) controllable random variation of both phase and amplitude from one pulse transmission to the next, and (3) an average amplitude that varies with range in the same manner that a received radar signal varies with range. A further object of the invention is to generate the above test signal at the intermediate frequency level and to provide means for changing the frequency of the I.–F. test signal to any value within a wide range so as to permit use of the signal in the I.–F. circuits of various receivers.

Briefly, the signal generator is constructed as follows: Pulses of I.–F. energy are applied to a pair of piezoelectric transducers which are coupled acoustically to a pair of short ultrasonic delay lines each having an echelon of parallel reflecting surfaces. These reflecting surfaces are separated by only a fraction of a pulse length and are arbitrarily spaced with respect to the I.–F. carrier wave length. The composite signal which is returned from such an echelon of reflecting surfaces possesses most of the characteristics of a radar I.–F. echo signal. The signals from the two echelon delay lines are applied through separate variable gain amplifiers to an adding circuit where the two signals are combined to form a composite signal. By varying the relative gains of the two amplifiers the relative contributions of the two delay lines to the composite signal may be varied to simulate clutter fluctuation. The composite signal output of the adding circuit is next applied to another amplifier the gain of which is caused to decrease in conformity with the reduction in clutter amplitude with range observed in a radar signal. The resulting signal, which now has all the characteristics of a received radar signal, is then applied to a frequency converter for changing the I.–F. carrier frequency of the signal to any desired value.

A detailed description of a preferred embodiment of the invention will be given in connection with the accompanying drawings, in which:

Fig. 1 is a block diagram of the signal generator;

Figs. 2a and 2b show the construction of the ultrasonic delay line and transducer;

Fig. 3 illustrates a video clutter signal; and

Figs. 4, 5 and 6 show schematic circuit diagrams of suitable practical embodiments of the elements shown in Fig. 1.

Referring to Fig. 1, periodically occurring trigger pulses, which would normally be synchronized with the transmitted pulses of the radar set, are applied to a pulse generator 1 and a contour generator 2. The pulse generator delivers a pulse having the desired duration to oscillator 3 which is keyed thereby to produce a corresponding pulse of high frequency energy. The frequency of this energy is shown as 10 megacycles, however, any other suitable frequency may be used. The high frequency pulses from oscillator 3 are applied to a pair of driver amplifiers 4 and 5. The outputs of drivers 4 and 5 are applied to acoustic devices 6 and 7 and also to the inputs of amplifier modulators 9 and 10, the outputs of which are added together without interaction in adding amplifier 11. Although only two parallel paths consisting of driver, acoustic device and modulator amplifier are shown in the drawing, any desired greater number may be employed. The outputs of the driver amplifiers are of the same form as their inputs although the voltage levels may differ, their primary function being to isolate the acoustic devices.

The construction of acoustic devices 6 and 7 is shown in Figs. 2a and 2b. The device consists of an ultrasonic delay line driven by a piezoelectric transducer. The delay line is made up of a cylindrical block 12 of quartz, or other suitable ultrasonic wave transmitting material such as glass, steel, etc. One end of the block has a flat surface while the opposing end is irregular. A convenient and effective way of obtaining the irregularity is to machine the opposing surface in the form of steps, as shown in Fig. 2a, to form an echelon of parallel reflecting surfaces. A suitable transducer, such as an X-cut quartz crystal 13 plated on opposite faces to form electrodes, is cemented to the flat end of the line. When a high frequency voltage is applied between terminals 14—15, connected to the crystal electrodes, ultrasonic waves are generated in the crystal and transmitted to the delay line. These waves travel down the delay line, are reflected by the stepped reflecting surfaces and return toward the transducer. A portion of the returned energy reenters the crystal and generates voltages between the crystal electrodes. The remainder of the energy is reflected from the flat end of the line and again travels toward the stepped reflecting surfaces with the result that, following the initial pulse of high frequency electrical energy applied to the transducer, many reflections of the resultant ultrasonic wave energy between transducer and echelon occur before the energy is finally dissipated. The amplitude of the I.–F. voltage appearing at terminals 14—15 at any instant is equal to the vector sum of all the voltages produced by the ultrasonic waves entering the transducer at that instant. If the surfaces of the reflecting echelon are separated by only a fraction of the applied pulse length, as measured by the acoustic wave velocity in the line material, and if this spacing and the spacing of the surfaces from the transducer bear no simple relation to the carrier wave length, as measured in the line, the I.–F. signal appearing at terminals 14—15 will be random in phase and amplitude. While acoustic devices 6 and 7 are the same in construction, the dimensions of the delay lines are made slightly different in order to have randomness of the phase and amplitude of their produced signals relative to each other.

Suitable dimensions are shown in Figs. 2a for an echelon delay line of quartz for use at 10 megacycles. However, these dimensions are given as an example only and may be varied over a wide range so long as the relationships set out above between the various dimensions of the line and the pulse and wave lengths of the driving electric energy are satisfied. Also instead of an echelon of flat parallel reflecting surfaces an arbitrarily irregular scattering surface may be used, however, echelon reflecting surfaces are preferable since they produce a higher signal level.

The modulator amplifiers 9 and 10 are variable gain I.–F. amplifiers. Gain sweep circuit 16 produces a pair of gain controlling voltages which are applied to modulator amplifiers 9 and 10 to control their gains. These voltages are alike but of opposite phase and have the form of an exponential sawtooth. By continuously varying the relative gains of amplifiers 9 and 10, the output of adding amplifier 11 can be made to have a continuously variable mixture of the two signals from acoustic devices 6 and 7, which introduces a certain randomness of both phase and amplitude from one pulse interval to the next. In this way the effect of clutter fluctuation in a radar signal is simulated.

The output of adding amplifier 11 is similar to a radar signal except as to the variation of its average amplitude with range. It is the purpose of contour modulator 17 to modify the amplitude of the applied signal with respect to time in such manner as to produce an output signal in which the decay following the initial pulse conforms to that observed in radar signals. Contour modulator 17 is a variable gain amplifier controlled by a voltage of the desired shape generated by contour generator 2. The action of the generator is initiated by the same trigger pulse applied to pulse generator 1. The output signal of contour modulator 17 has all the characteristics of a received radar signal, however, its I.–F. carrier frequency of 10 mc. may not be suitable for use in the I.–F. amplifier of the radar receiver being used or under test. The signal is therefore applied to a frequency converter 18 which changes the I.–F. to any desired value without destroying the other characteristics of the signal. If the output signal of converter 18, without clutter fluctuation, were introduced into the I.–F. amplifier of a radar receiver having a type A display the result on the screen of the cathode-ray tube would be similar to that shown in Fig. 3. This figure also shows the desired variation in average amplitude of the clutter with range.

Schematic diagrams of suitable embodiments of the various elements of Fig. 1 are shown in Figs. 4, 5 and 6. Referring to Fig. 4, the pulse generator 1 comprises cathode follower 19, blocking oscillator 20, negative overshoot clipper 21, cathode follower 22 and inverter 23. This circuit is triggered by the trigger pulse applied to the grid of tube 19 and operates to produce at the output of tube 23 a negative pulse of the desired duration and shape, and of sufficient amplitude to key the pulsed oscillator 3. The duration of the pulse may be, for example, from ½ to 1 microsecond. Pulse oscillator 3 comprises oscillator 24, keying tube 25 and output amplifier 26. Application of a negative pulse to the grid of tube 25 cuts this tube off, removing its damping effect on the resonant circuit of the oscillator and also raising the anode potential of tube 24. This permits the Hartly oscillator circuits comprising this tube to oscillate for the duration of the pulse. The high frequency oscillations are amplified by tube 26 and applied in parallel to the drivers 4 and 5 which are the amplifiers located in envelope 27. The acoustic device 6, which may be considered that shown in Fig. 2a, is connected between terminal 14 and ground. Similar acoustic device 7 is connected between terminal 28 and ground.

The amplifier modulator 9 comprises I.–F. amplifiers 29 and 30 and variable gain I.–F. amplifier 31 as shown in Fig. 5. Similarly, amplifier modulator 10 comprises I.–F. amplifiers 32 and 33 and variable gain I.–F. amplifier 34. The gain sweep circuit 16 comprises limiter amplifier 35, clipper 36, amplifier 37 and phase inverter 38. A sine wave of audio frequency is applied to the grid of tube 35 and, through the action of grid limiting resistor 39 and clipping diode 36, is converted into a square wave at the grid of amplifier tube 37. An amplified square wave therefore appears on the anode of tube 37. This wave is applied to an adjustable integrating circuit consisting of resistor 40 and one of five condensers selected by switch 41. The integrating circuit produces from the square wave an exponentially varying saw-tooth wave, various forms of which may be selected by switch 41. The sawtooth wave is applied to the parallel connected grids of phase inverter 38 which splits the wave into two identical but oppositely phased parts. One of these is applied to a gain controlling grid in tube 31 and the other to a similar grid in tube 34.

Adding amplifier 11 consists of two amplifier tubes 42 and 43 having their anode circuits connected in parallel. The outputs of variable gain amplifiers 31 and 32 are applied to the grids of tubes 42 and 43, respectively.

The contour modulator 17 comprises tube 44 and power amplifier 45, while contour generator 2 comprises trigger inverter 46, one-cycle multivibrator 47, limiting diode 48 and cathode follower 49. The composite signal obtained from tubes 42 and 43 is applied to the control grid of tube 44 the gain of which is varied by varying the potential on the suppressor grid by means of a voltage generated by the contour generator. The multivibrator comprising tube 47, being of the cathode coupled positive grid type, is normally in its stable condition in which the left hand portion of tube 47 is conducting and the right hand portion is cut off. The right hand portion is maintained in a nonconductive condition by the potential drop across the common cathode resistor. Tube 46 is normally biased beyond cut-off. Under the above condition the anode potential of the left hand section of tube 47 has its lowest value, condenser 50 has its lowest charge, the voltage on the suppressor grid of tube 44 has its lowest value and as a result, the gain of tube 44 is at its minimum. Upon application of a positive trigger pulse to the grid of tube 46 the anode of this tube drops in potential pulling down the grid of the left hand section of tube 47 with it. This initiates a switching action in which the left hand section immediately becomes nonconductive and the right hand section becomes fully conductive. However, this condition exists only so long as the discharge current of condenser 51 flowing through resistors 52 and 53 is sufficient to keep the left hand section cut off. When this decreasing current allows the grid of this section to rise to the cut-off point the left hand section begins to conduct and initiates a rapid reverse switching action which returns the circuit to its original condition of stability. The result of this cycle of operation is a positive pulse at point 54 the duration of which is determined by the value of resistor 53. This duration is made comparable to that of the I.-F. pulse output of oscillator 3 (Fig. 1).

The positive pulse at point 54 causes condenser 50 to almost instantaneously change to a voltage determined by the point at which diode 48 becomes conductive. The value of this maximum voltage may be adjusted by potentiometer 55. The charging of condenser 50 is accompanied by an immediate charging of condenser 56 to its maximum potential, due to the low resistance of its charging path through tube 47, and by an immediate increase in the suppressor grid potential of tube 44 thus raising its gain to maximum. At the end of the positive pulse at point 54 the charging voltage is removed from across condenser 50, tube 48 becomes nonconductive and condenser 50 discharges through resistor 57. The gain control voltage on the suppressor grid of tube 44 follows the decline in voltage across condenser 50 and exponentially lowers the gain of this tube. The time constant of the discharge circuit of condenser 50 is so selected that the average amplitude of the I.-F. clutter signal in the output of contour modulator 44 decays in the manner illustrated for the video signal in Fig. 3.

A suitable embodiment of frequency converter 18 is shown in Fig. 6. The circuit comprises a shielded adjustable oscillator 59 and amplifier 60. The output of amplifier 60 is applied to one grid of mixer tube 61 and the output of power amplifier 45 (Fig. 5) of the contour modulator is applied to another grid. The two frequencies are intermodulated by the mixer and the desired new I.-F. for example 30 megacycles, is selected from the modulation products by tuned I.-F. amplifier 62.

I claim:

1. A signal generator comprising a source of short duration pulses of high frequency electrical energy; an acoustic delay line consisting of a block of material capable of transmitting acoustic waves of the same frequency as said electrical energy, said block having a flat surface and an oppositely disposed irregular surface; an electromechanical transducer acoustically coupled to said flat surface; means coupling said source of pulses to the electrical circuit of said transducer; a volume controlling device having a variable ratio of output to input signal; means coupling the electrical circuit of said transducer to the input of said volume controlling device; means associated with said volume controlling device and synchronized with said pulses and acting after each pulse to decrease said ratio as a function of time measured from said pulse; and means for coupling a utilization circuit to the output of said volume controlling means.

2. A clutter simulator comprising a source of short duration pulses of high frequency electrical energy; a plurality of random voltage generators each comprising a block of material capable of transmitting acoustic waves of the same frequency as said electrical energy, said block having a flat surface and an oppositely disposed irregular surface dissimilar to the irregular surfaces of the other blocks, and an electromechanical transducer acoustically coupled to said flat surface, the acoustic coupling between said transducer and said block introducing a sufficient mismatch therebetween to cause multiple reflections to occur between said flat and irregular surfaces; means for applying said pulses to the electrical circuits of said transducers in parallel; and means for vectorially adding together the voltages in the electrical circuits of said transducers to produce a composite signal.

3. A clutter signal generator comprising a source of short duration high frequency electrical pulses; a pair of acoustic delay lines each in the form of a block of material capable of transmitting acoustic waves of the same frequency as said electrical energy and each having a flat surface and an oppositely disposed irregular surface, said irregular surfaces being slightly dissimilar; a pair of electromechanical transducers each acoustically coupled to the flat surface of one of said delay lines; means for applying said pulses to the electrical circuits of said transducers; means for coupling the electrical circuits of said transducers to an adding circuit for vectorially adding the signals obtained from said electrical circuits; an output circuit for said signal generator; an amplitude controlling device having a variable ratio of output to input signal connected between the output of said adding circuit and said generator output circuit; and means associated with said amplitude controlling device and acting after each pulse to decrease said ratio as a function of time measured from said pulse.

4. Apparatus as claimed in claim 3 in which means are interposed between the electrical circuits of said transducers and said adding circuit for continuously varying the amplitudes of the signals applied to said adding circuit as equal but oppositely phased functions of time.

5. Apparatus as claimed in claim 4 in which the irregular surface of each of said delay lines comprises planar surfaces parallel to the flat surface of the line and at different distances therefrom.

6. Apparatus as claimed in claim 5 in which frequency conversion means are interposed between the output of said amplitude controlling device and said generator output circuit.

7. A signal generator comprising a source of short duration electrical pulses, an acoustic delay line consisting of a block of acoustic wave transmitting material having a flat surface and a coextensive oppositely disposed irregular surface comprising a plurality of planar surfaces parallel to said flat surface and at different distances therefrom, an electromechanical transducer acoustically coupled to said delay line over the entire area of said flat surface for simultaneously energizing the plurality of parallel acoustic paths established between said flat surface and said planar surfaces, and means for electrically coupling said source of pulses and an output circuit to said transducer, the acoustic coupling between said transducer and said delay line introducing a sufficient mismatch therebetween to cause multiple reflections to occur between said flat surface and said planar surfaces.

8. A signal generator comprising a source of short duration pulses of high frequency electrical energy; an acoustic delay line consisting of a block of material capable of transmitting acoustic waves of the same frequency as said electrical energy, said block having a flat surface and an oppositely disposed irregular surface, said irregular surface comprising a plurality of planar surfaces parallel to said flat surface and at different distances therefrom with each planar surface being spaced from another planar surface by less than a pulse length in said block material measured along a normal to the two surfaces; an electromechanical transducer acoustically coupled to said flat surface; and means for electrically coupling said source of pulses and an output circuit to said transducer; the acoustic coupling between said transducer and said block introducing a sufficient mismatch therebetween to cause multiple reflections to occur between said flat and irregular surfaces.

References Cited in the file of this patent

UNITED STATES PATENTS

| | | |
|---|---|---|
| 2,405,591 | Mason | Aug. 13, 1946 |
| 2,398,701 | Firestone | Apr. 3, 1946 |
| 2,474,875 | White | July 5, 1949 |
| 2,461,181 | Rosenberg | Feb. 8, 1949 |
| 2,493,638 | Olson | Jan. 3, 1950 |
| 2,624,852 | Forbes | Jan. 6, 1953 |
| 2,709,760 | Valkenburg | May 31, 1955 |